Patented Mar. 28, 1950

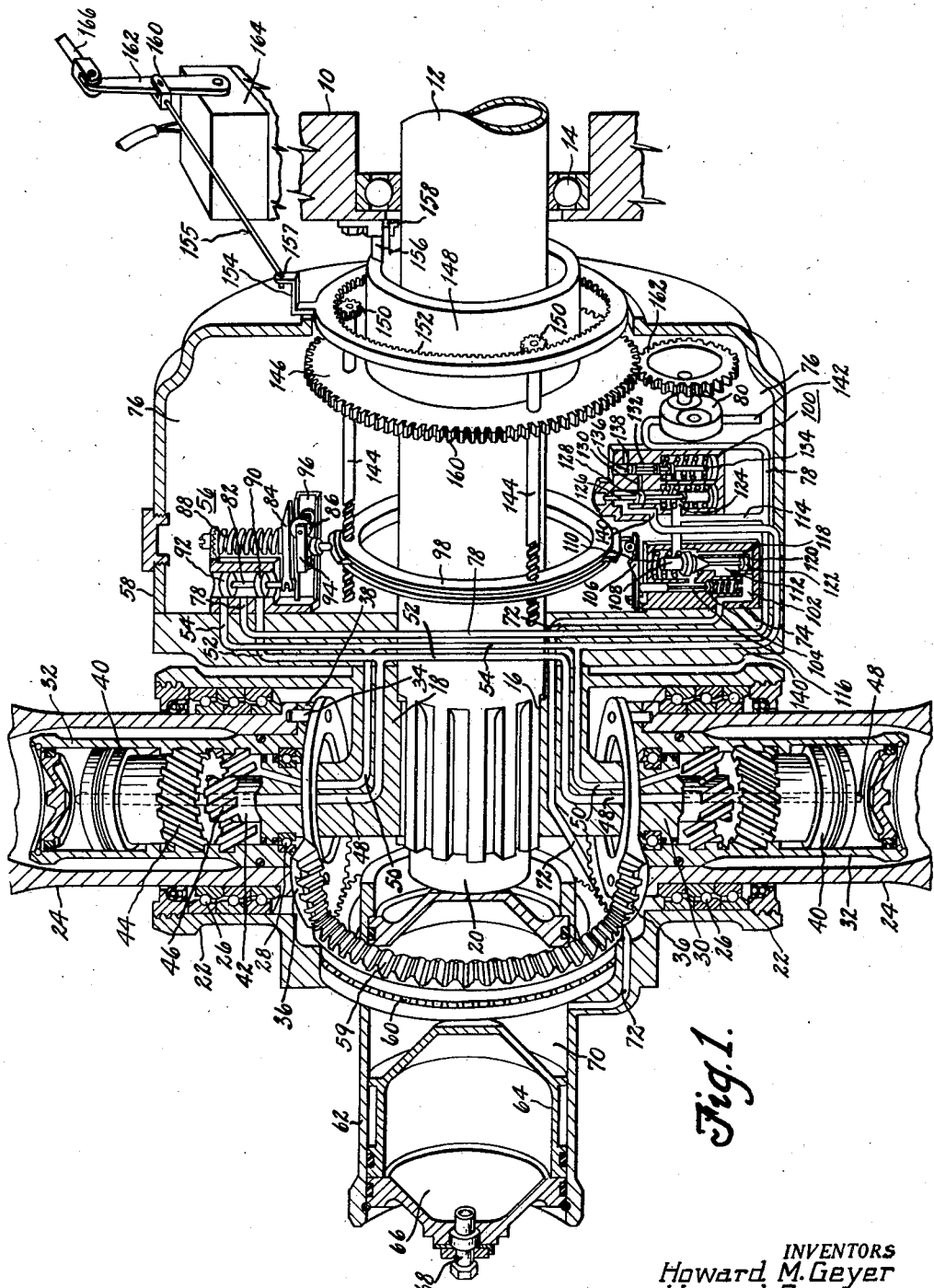

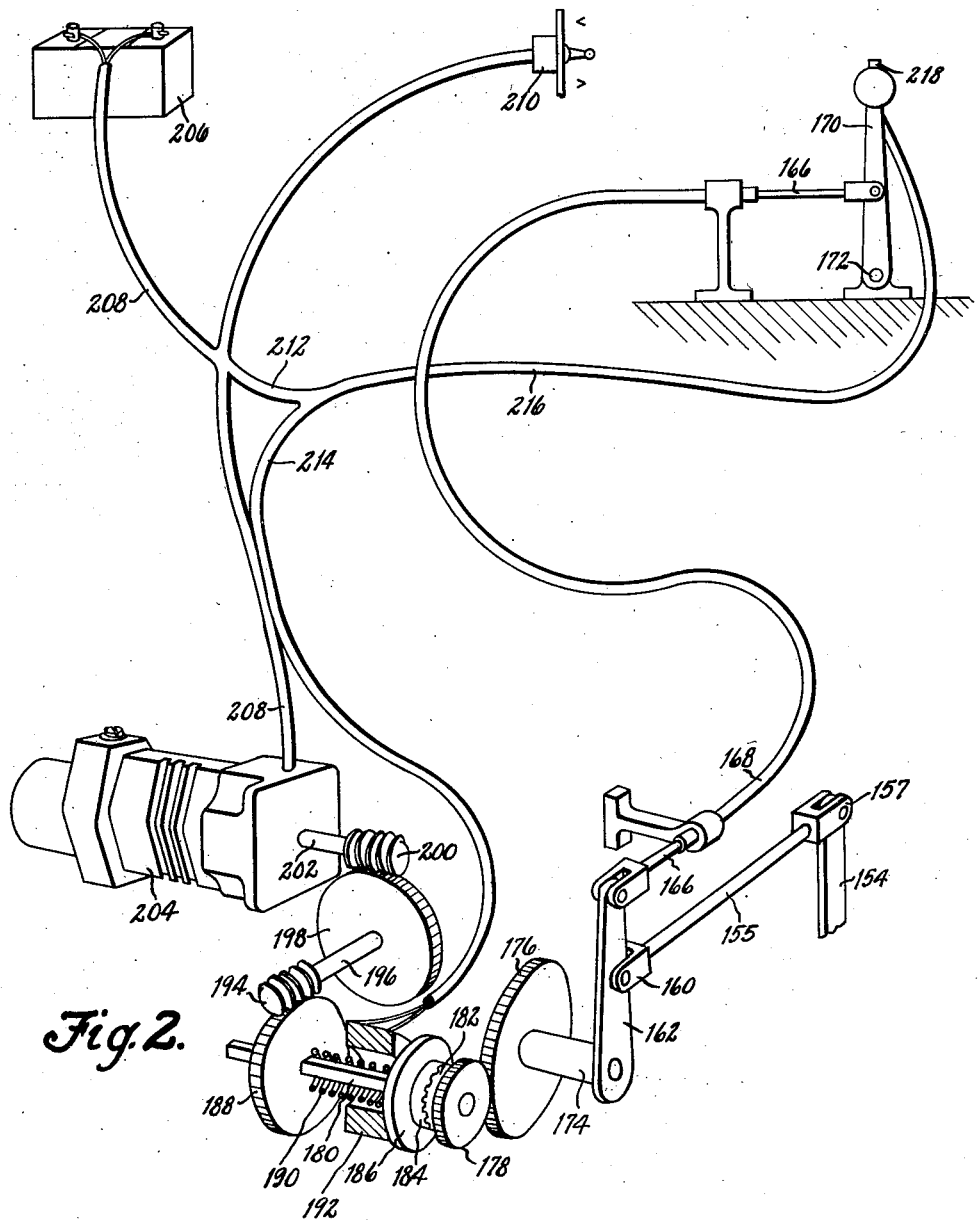

2,502,041

UNITED STATES PATENT OFFICE 2,502,041

PROPELLER CONTROL

Howard M. Geyer, Dayton, Ohio, and Howard Carson, Cambridge, Mass., assignors to General Motors Corporation, Detroit, Mich., a corporation of Delaware Application November 20, 1946, Serial No. 711,028

7 Claims. (Cl. 170—160.21)

This invention relates to controls for aircraft propellers, and has for an object overriding the automatic control with manual or other control means to assist, correct, or augment the automatic control.

Another object of the invention is to provide an auxiliary control for constant speed propellers that may suit the needs of pilots in incidental and unusual maneuvers of the aircraft.

Another object of the invention is to provide an auxiliary control assembly that is adapted to be installed on existing apparatus not designed for override control.

Still another object of the invention is to provide an auxiliary control for a self-contained constant speed propeller for effecting a selectable measured incremental shift of the propeller mechanism, of an instantaneous shift of greater magnitude to fit the existing conditions.

Yet another object of the invention is to provide control for a constant speed propeller by which there is always available to the pilot means for either gradually or suddenly shifting from any regulated blade pitch position to either a blade feathering position, a blade braking position, or from said blade feathering and braking positions to any regulated position within the constant pitch blade pitch range.

Further objects and advantages of the present invention will be apparent from the following description reference being had to the accompanying drawings wherein a preferred embodiment of the present invention is clearly shown.

In the drawings:

Fig. 1 is a schematic drawing in section of a propeller mechanism embodying the instant invention.

Fig. 2 is a perspective view of the control linkage of the present invention segregated from the propeller mechanism.

The foregoing objects and advantages are accomplished by providing a small electric motor with a great speed reduction gearing that is adapted to actuate the customary control lever of the propeller mechanism, with a source of electric energy and switches for selectively actuating the motor. The motor is one of the type associated with or having a built-in brake for suddenly arresting rotation of the motor in either direction promptly on interruption of driving energy. The gearing is provided with a normally engaged but separable clutch so that the motor is normally conditioned to actuate the control lever of the propeller mechanism. A two-position switch controls the direction of rotation and the amount of rotation of the motor, while a lever or manual linked for actuating the control lever of the propeller also incorporates a switch adapted to energize a solenoid on the clutch for interrupting the gear connection from the motor when movement of the manual is to effect actuation of the propeller control lever.

In aircraft fitted with constant speed propeller installations, there frequently arise conditions when it is desirable or necessary to make a further adjustment of the blade pitch position to fit the needs of flight. The desired adjustment may be small or it may be of great magnitude, and the constant speed control mechanism usually is not disposed to make the adjustment. It may be in order to shift the pitch only a few degrees, while feeling the point of best setting, or it may be necessary to shift to a feathered position, or even a craft braking position. In any instance it is necessary that the pilot be able to reset the automatic constant speed control and apply his selected control. It is also necessary that the automatic control be restored at any instant that he selects.

Referring particularly to the drawings, and first with respect to Fig. 1, an engine nosing or supporting structure is indicated at 10 from which extends a propeller shaft 12 supported by an anti-friction bearing 14, the shaft 12 having splined driving connection at 16 with a propeller hub 18 and retained thereon in any suitable manner as by the usual hub-shaft nut 20. The hub 18 provides sockets 22 within which are journalled for rotation blades 24 through the agency of stack bearings 26 and preload bearing 28 supported by a blade boss 30. Within the shank of the blade 24 there is a hydraulic cylinder 32 maintained in driving relation with the blade by pins or dowels 34 extending through a blade gear 36, a flange 38 of the cylinder and into the end of the blade shank. A piston 40 within the cylinder 32 has helical splined connections between the cylinder 32 and a spindle 42 extending from blade boss, such as indicated at 44 and 46, so that lineal movement of the piston 40 within the cylinder 32 will effect rotation of the blade 24 about its axis on the bearings 26 and 28.

For actuating the piston a fluid pressure line 48 in the hub 18 extends along the spindle 42 to the out end of the cylinder, while a second line 50 communicates with the inward end of the cylinder as shown. Both lines 48 and 50 are carried rearwardly from the hub 18 to conduits 52 and 54 that communicate with the distributing ports of a governor valve 56 situated in a hydraulic regulator 58 mounted on and rotatable with the propeller. The propeller may embrace any number of blades, and it is understood that all have the cylinder and piston with fluid connections to the conduits 52 and 54 so that all pistons will be actuated at the same instant and to the same amount. A master gear 59 engaging all of the blade gears 36 correlates the action of all of the blades. The master gear is journalled within the forward end of the hub 18 by suitable bearings, such as at 60 that surrounds a concentrically mounted accumulator 62 that is disposed axially in front of the propeller shaft 12. The accumulator comprises a rigid cylinder housing a skirted piston 64 that divides the cylinder into a preload compartment 66 charged through a filler valve 68, and a pressure compartment 70 chargeable and exhausting through a passage 72 threading through the hub 18 to an accumulator control valve assembly 74 situated in the regulator 58.

The regulator is usually affixed at the rear of the hub and mounted on a rear extension thereof so as to rotate with the propeller, and provides a reservoir or annular chamber 76 normally closed to outside air. The reservoir contains a quantity of oil or other pressure operating fluid, the medium by which the control of blade pitch is effected. Pressure control valve mechanism and pressure developing mechanism are housed within the reservoir and may include the governor valve 56 from which the control lines 48 and 50 extend to the blade cylinders, and to which extends a pressure supply line 78 fed by a pump 80. The governor valve assembly 56 embodies a plunger 82 that is in itself a centrifugally responsive member and is linked to a lever 84 oscillating over a movable fulcrum roller 86 against the yielding force of a rigidly supported spring 88, the plunger 82 having a pair of spaced lands 90 and 92 adapted when the plunger is in the equilibrium position to cover ports in the governor leading to the control lines 52 and 54. The fulcrum roller is mounted on a carriage 94 movable along guideways 96 by a shiftable control ring 98 as will presently appear, and due to which the relation of centrifugal force acting upon the valve plunger 82 is within the control of the pilot. That gives the pilot an exact control of the speed level at which the governor valve will control the propeller to constant speed. In other words movement of the fulcrum roller selects the constant speed at which the governor will maintain the propeller mechanism. In so operating, the governor in responding to changes of centrifugal force, administers the fluid under pressure coming in from the pressure line 78 in application of the pressure to either one of the control lines 52 or 54, all substantially as described and claimed in the U. S. patents to Blanchard et al. 2,307,101 and 2,307,102 granted January 5, 1943.

To properly condition the potential of pressure in the line 78 and keep it impressed to a sufficient extent to meet the needs called for by the governor valve, there is a pressure control unit 100 and the accumulator control valve assembly 74 connected into the fluid circuits between the pump 80, the governor 56 and the accumulator 62. The accumulator feed line 72 communicates with a chamber 102 of the assembly 74 which chamber is controlled by a trip and filler valve 104 selectively operable by a cam carrying lever 106 in response to movement of the control ring 98 as will be presently explained. A feathering and braking control valve 108 is embodied in the assembly 74 and normally separates a chamber 110 subject to pump pressure, from a chamber 112 normally exposed to accumulator pressure. A branch pipe 114 extends from the pump line 78 to the chamber 110 which also communicates with the bore 116 for the trip valve 104, while a branch 118 from the chamber 112 extends to a chamber 120 on the under side of a land or piston 122 carried by the valve 108. The branch pipe 114 also connects with a chamber 124 housing a pressure control valve plunger 126 that has a land 128 controlling a port 130 leading to the valve bore 132 of a minimum pressure control valve 134, both of which are situated in the pressure control unit 100. The minimum pressure valve provides a land 136 that controls an exhaust port 138 emptying into the reservoir 76 such that escape of fluid under pressure from the valve 126 must build up to a predetermined value through the port 130 before it can spill into the reservoir. Further control of the spill is effected by a fluid connection 140 opening to the back side of the land 128 and connected to the increase pitch pressure line 54.

With the pressure developing means and pressure controlling means organized as described, the operation will be in substance as described and claimed in a co-pending U. S. application Ser. No. 616,808 filed in the name of D. A. Richardson et al. for Accumulator control unit, and which may be briefed as follows. Actuation of the pump 80 which draws in fluid from the reservoir 76 through the pump intake 142 creates pressure in the pressure line 78 which penetrates to the pressure control valve, the accumulator valve and to the governor valve. At the pressure control valve the land 128 is urged inward to uncover the port 130 in opposition to the pressure from the increased pitch port through 140, and which controls in conjunction with the minimum pressure valve, the potential of pressure existent in the passages 114 and 78. That pressure exerts itself in chamber 110 to open the valve 104 for charging the accumulator, and surrounds the valve 108 as well as presses upon the piston 122. The distribution of pressures upon the valve 108 is such that it normally remains seated against relieving pressure in the accumulator. However, upon unseating the valve 104 by the lever 106 the high pressure of the accumulator is admitted to the under side of the valve 108 and the piston 122 to afford direct communication between the chamber 102 and 110 through the chamber 112, thereby exposing the potential of the accumulator to the branch 114 and pressure passage 78 to the governor valve. The accumulator is open to the pressure line only upon definite and predetermined positioning of the control ring 98, and during which time one of the control lines 52 or 54 is wide open at the governor to receive the additional flow from the accumulator. As soon as that flow stops, as a result of the completed movement of the piston 40 that is called for by the governor, then the pressure differentials applied to the valve 126 are reduced and it reseats ready for a subsequent operation of the control mechanism.

Selective control of the governor valve 56 and the accumulator control valve 74 is effected by predetermined movement of the control ring 98, which is accomplished by high-lead screws 144 threading therethrough and having a journal bearing in a flange 146 of an adapter sleeve 148 projecting into the regulator 58 from a fixed support on the nosing 10. Pinions 150 secured to the end of each of the screw shafts 144 mesh with an internal toothed ring gear 152 that is supported on the adapter sleeve 148 outside of the regulator 58, the ring gear having a control lever 154 actuatable by suitable linkage from the cockpit of the craft. The adapter sleeve 148 is provided with a lug 156 engageable within a notch 158 on the support 10 for restraining rotation of the adapter assembly when the regulator rotates. The ring gear 152, flange 146, screw shafts 144, and control ring 98 are therefore held stationary within the regulator 58 while the latter rotates around them, and particularly the flange 146 which is provided with a series of teeth 160 engageable with a pinion 162 of the pump 80 for driving it upon rotation of the propeller.

The linkage connecting the lever 154 to the pilot's compartment may take various forms, but in the present instance incorporates a rod 155 provided with a yoke or other pivotal connection 157 with the lever 154 and a second yoke or pivotal connection 160 with a mid point of a lever or crank arm 163 secured to a shaft extending from an actuator unit 164. The actuator unit may be rigidly affixed to any convenient part of the supporting structure near the ring gear, and the lever 162 is connected by a Bowden wire or flexible cable 166 housed within a sheath 168, to a control lever or manual lever means or the like 170 pivotally supported at 172 in the cockpit near the pilot, substantially as indicated in Fig. 2 of the drawings.

The actuator unit 164 houses a motor and mechanism for oscillating the lever 162 in either direction for controlling the movement of the lever 154 and consequently the movement of the fulcrum roller 86 and the lever 106. The lever 162 has one end in driven relation upon a shaft or hub 174 that carries a large gear 176, meshing with a pinion 178 loosely retained and rotatable upon a shaft 180. The pinion 178 has a clutch face 182 engageable with a cooperating clutch face 184 slidable but non-rotatable relative to the shaft 180 that is driven by a worm wheel 188. A spring 190 encompassing the shaft 180 and extending between the worm wheel 188 and an armature disc 186 carried by the clutch member 184 operates normally to maintain the clutch members 182 and 184 in driving engagement. A solenoid coil 192 is disposed to be in attractive relation to the armature disc 186 so that its energization will operate to open the clutch members 182 and 184. A worm 194 drives the worm wheel 188 since it is carried by a shaft 196 driven by a worm wheel 198 engaged by a worm 200 on the end of a motor shaft 202 of a reversible motor 204. The motor 204 is powered by a current source such as a battery 206 through a power lead or cable 208 electrically controlled by a two position switch 210. Branch connection 212 of the cable 208 joins a cable 214 leading to the solenoid 192 while a cable 216 joined thereto leads to a push button switch 218 mounted on the manual 170 and affords selective control for energization of the solenoid.

A measured shift of the blade pitch, such as a change in the speed level at which the regulator mechanism is to control for constant speed, is now effected by the pilot flipping the switch 210 to the proper position, which may be up with respect to the drawing for increase pitch setting and down for decrease pitch setting. In either "on" position of the switch 210 the motor 204 will be energized to drive the shaft 202, worm 200, worm wheel 198, worm 194, worm wheel 188, shaft 180 and clutch member 184. If the clutch faces 182 and 184 are in engagement the pinion 178 will be driven as will also the gear 176 which turns the shaft 174 and swings the lever 162 through an arc and causes a reciprocation of the link 155 with a consequent arcuate movement of the lever 154 and ring gear 152 on the adapter assembly. Movement of the ring gear 152 actuates the pinions 150 which by the attached screw shafts moves the control ring 98 fore or aft along the axis of the regulator and in so moving pushes the carriage 94 and its fulcrum roller 86 along the length of the guide ways 96 and governor lever 84. Changing the position of the fulcrum roller 86 relative to the lever 84 alters the relation of forces, centrifugal and spring, acting upon the valve plunger 82 and in consequence sets up a new set of conditions at which the valve will be in the equilibrium condition. When the desired setting has been attained, the pilot opens the switch 210 and the motor 204 abruptly stops because of the lack of driving energy and the operation of a built-in brake that takes effect immediately that current to the motor is cut off.

A quick or instantaneous shift to either feathered pitch or negative pitch for braking may be effected by the pilot upon movement of the manual lever means or the like 170. The gear train between the motor shaft 202 and the oscillating shaft 174 is of great ratio, such as of the order of 20,000 to 1, which results in an irreversible gear connection by which any movement of the lever 162 can effect movement of the gear train. The ratio of gears also provides a slow movement of the lever 162 for any material rotation of the motor shaft, and consequently coasting of a few turns of the motor shaft following current interruption does not move the lever 162 or anything connected to it beyond the point of selected setting. Thus when the pilot desires to move the lever 170, he also closes the switch 218 which energizes the solenoid 192 and effects attraction of the armature disc 186 for opening the clutch. With the clutch opened then the lever 170 being moved will slide the cable 166 within the sheath 168 and cause oscillation of the lever 162 and reciprocation of the link 155 to actuate the propeller control lever 154. Oscillation of the lever 162 will effect rotation of the gear 176 and the pinion 178 freely on the shaft 180, since the disengaged clutch at 182 and 184 does not cause rotation of the rest of the gear train to the motor. The result is that movement of the lever 170 causes movement of the carriage 94 along the ways 96 as has been described. If the lever 170 is moved to one extreme then the carriage is moved to a position for feathering the blades of the propeller, and if the lever is moved to the opposite extreme then the carriage is moved to a position for braking which is in the reverse or negative pitch position. When the carriage 94 is moved to the feathering position the control ring 98 also actuates the cam carrying lever 106 that moves the tripping valve 104 so that the full force of the accumulator may be applied to the governor valves of the regulator. In order to unfeather the propeller blades, the lever 170 is moved out of the feathered position, which, by the linkage described partially returns the carriage 94 toward the governing position and also retrips the trip valve 104 which exposes the charge of the accumulator to the governor valves of the regulator, and results in rotating the blades out of their feathered position. When the carriage is moved to the braking position, at the out end of the lever 84, there is no movement of the lever 106, but the governor valve is so disturbed that it will open wide the ports of the decrease pitch line which effects movement of the blades through their zero pitch setting to a negative value and thereby reverses the thrust of the propeller though the direction of rotation remains the same. In any instance, movement of the manual lever 170 from either extreme position to an intermediate position quickly returns the blade setting to the range where the governor is effective to control the propeller to constant speed. Instead of instantaneously attaining the governed pitch setting by movement of the lever 170 to an intermediate position, the same may be accomplished over a longer elapse of time by use of the switch 210. Moving it to the proper position and leaving it there long enough will cause the blades to gradually move from any governed pitch setting to either the feathered position, or to the braking position, or from either of the extreme positions, i. e. braking or feathering, back to a selected governed pitch setting. When the desired setting is attained, opening of the switch 210 will stop the shift, and the governor mechanism will pick up from there and control the propeller to the constant speed selected.

While the embodiment of the present invention as herein disclosed, constitutes a preferred form, it is to be understood that other forms might be adopted, all coming within the scope of the claims which follow.

What is claimed is as follows:

1. In a constant speed aircraft propeller having pitch shiftable blades, a source of power and mechanism for shifting the blades throughout a range of pitch setting, with selective control means working upon the shifting mechanism and including a lever for control of the pitch setting of the propeller, means for actuating the lever, comprising in combination, an electric motor with gearing for actuating the lever in slow motion in either direction, switch means and a current source for controlling the operation of said motor, a manual control means for actuating the lever and embodying a clutch and circuit connections for interrupting the motor gearing to said lever whereby manual fast movement of said lever may be accomplished.

2. In a constant speed aircraft propeller having pitch shiftable blades, a source of power and mechanism for shifting the blades for feathering, governed pitch, or braking, with selective control means working upon the shifting mechanism and including a lever for control of the pitch setting of the propeller, means for actuating the lever, comprising in combination, a reversible electric motor with speed reducing gearing ending in a crank arm for actuating the lever in either direction, said gearing including a normally closed clutch but separable for interrupting the gearing adjacent said crank arm, a manual control means for actuating the lever directly in lieu of motor operation, and means including a current source, clutch shifter and switch means for controlling the motor operation and gear connection to effect selected rapid and slow movement of the said lever, whereby feathering pitch and braking pitch for the propeller may be superposed upon the constant speed control of said propeller.

3. In a constant speed aircraft propeller having pitch shiftable blades, a source of power and mechanism for shifting the blades throughout a range of pitch setting, with selective control means working upon the shifting mechanism and including a lever for control of the pitch setting of the propeller, means for actuating the lever, comprising in combination, a reversible motor means, a crank arm operatively connected to the said lever, speed reduction gearing connecting the motor and said crank arm, a clutch mechanism in the gearing for connecting and disconnecting the motor with the crank arm, and means operable upon the clutch for controlling the said gear connection.

4. The combination set forth in claim 3 wherein the means operable upon the clutch comprise a solenoid and armature adapted to disengage the clutch mechanism.

5. In a constant speed aircraft propeller having pitch shiftable blades, a source of power and mechanism for shifting the blades throughout a range of pitch setting, with selective control means working upon the shifting mechanism and including a lever for control of the pitch setting of the propeller, means for actuating the lever, comprising in combination, an actuator unit outside of the propeller mechanism having a crank arm for actuating the said lever directly, said actuator unit comprising a motor and an interruptable gear train for slow movement of said lever, and means remote from the actuator unit for controlling the operation of the motor and gear train.

6. In an aircraft propeller having pitch shiftable blades and control mechanism for shifting the blades in feathering pitch, governed pitch and negative pitch by a power source applied to the control mechanism through the action of a selectively operable control lever for determining the character and amount of blade pitch to be effected by the control mechanism, remote controlled means for actuating the control lever comprising in combination, a reversible electric motor and reduction gear train having a crank arm operatively connected to said control lever, a normally engaged clutch in the gear train tending to maintain driving relation from the motor to the crank arm, a solenoid operable when energized to disengage the clutch, a source of current and switch means for control of the motor operation, manually actuated means for overriding the motor driven means in actuating the control lever including a directly connected member for fast movement of the crank arm when the clutch is disengaged, and a switch for controlling the energization of said solenoid to disengage the clutch when the motor driven means is overridden.

7. In an aircraft propeller having pitch shiftable blades, motor means for shifting the blades, and pitch control means for directing the application to the motor means of power developed by rotation of the propeller for effecting feathered pitch, governed pitch, and negative pitch, with said pitch control means providing a control lever fixed relative to the rotating propeller and adapted to select the pitch under which the propeller is to operate, remotely controlled means for adjusting the control lever comprising in combination, a slow speed control including a speed reduction gearing terminating at the driving end in a crank arm operatively connected to actuate the control lever, a releasable clutch normally connecting the gear train with the crank arm for actuation thereof, a high speed reversible motor for driving the gear train to actuate the crank arm at slow speed, a source of power and control means for selectively operating the motor in either direction, and a fast speed control including a manually actuated lever directly connected to the crank arm, and electromagnetic means adapted to disengage the releasable clutch in the gear train when the crank arm is operated by the manually actuated means.

HOWARD M. GEYER.
HOWARD CARSON.

REFERENCES CITED

The following references are of record in the file of this patent:

UNITED STATES PATENTS

| Number | Name | Date |
|---|---|---|
| 653,478 | King | July 10, 1900 |
| 2,073,426 | Pearson | May 9, 1937 |
| 1,144,429 | Martin | Jan. 17, 1939 |
| 2,299,635 | MacNeil et al. | Oct. 20, 1942 |
| 2,319,552 | Martin | May 18, 1943 |
| 2,352,736 | Richmond | July 4, 1944 |